US010700797B2

(12) United States Patent
Jacob (10) Patent No.: US 10,700,797 B2
(45) Date of Patent: Jun. 30, 2020

(54) SIGNAL PROCESSING USING MULTIPLE SOURCES

(71) Applicant: NXP B.V., Eindhoven (NL)

(72) Inventor: Naveen Jacob, Bangalore (IN)

(73) Assignee: NXP B.V., Eindhoven (NL)

( * ) Notice: Subject to any disclaimer, the term of this patent is extended or adjusted under 35 U.S.C. 154(b) by 41 days.

(21) Appl. No.: 15/643,794

(22) Filed: Jul. 7, 2017

(65) Prior Publication Data

US 2019/0013885 A1    Jan. 10, 2019

(51) Int. Cl.
*H04H 40/18* (2008.01)
*H04B 1/12* (2006.01)
(Continued)

(52) U.S. Cl.
CPC ............ *H04H 40/18* (2013.01); *H04B 1/126* (2013.01); *H04B 7/0885* (2013.01);
(Continued)

(58) Field of Classification Search
CPC .... H04B 7/005; H04B 7/0817; H04B 7/0842; H04B 7/0845; H04B 7/0871; H04B 7/0885; H04B 7/0891; H04B 7/10; H04B 7/12; H04B 1/126; H04H 20/16; H04H 20/22; H04H 20/33; H04H 20/38; H04H 20/40; H04H 20/426; H04H 20/53; H04H 20/71; H04H 40/18; H04H 40/36; H04H 2201/11; H04H 2201/12; H04H 2201/13; H04H 2201/16; H04H 2201/70; H04L 25/0202; H04L 25/0204; H04L 25/0206;
(Continued)

(56) References Cited

U.S. PATENT DOCUMENTS 4,697,260 A    9/1987 Grauel et al.
4,754,453 A    6/1988 Eizenhofer
(Continued)

FOREIGN PATENT DOCUMENTS

CA    2325026 A1    9/1999
EP    1982332 A1    12/1993
(Continued)

OTHER PUBLICATIONS

Extended Search Report for Patent Appln. No. EP18175716 (dated Nov. 28, 2018).

*Primary Examiner* — Young T Tse
(74) *Attorney, Agent, or Firm* — Rajeev Madnawat (57) ABSTRACT

Aspects of the disclosure are directed to providing signals utilizing two or more sources. As may be implemented in accordance with one or more embodiments, a method and/or apparatus involves processing respective signals carrying broadcast data provided by different receiver circuits that respectively receive the same broadcast data. The signals received from the respective receiver circuits are equalized, and corresponding sets of the broadcast data from each of the equalized signals are selectively combined to provide a combined signal carrying the broadcast data. This approach may be used, for example, to generate broadcast data utilizing source data from two or more receivers, such as may be received on different signal mediums (e.g., over-the-air digital radio and Wi-Fi digital radio), and therein providing enhanced reception.

20 Claims, 3 Drawing Sheets

(51) Int. Cl.
*H04L 25/03* (2006.01)
*H04B 7/08* (2006.01)
*H04L 25/02* (2006.01)
*H04W 84/12* (2009.01)

(52) U.S. Cl.
CPC ... *H04L 25/03019* (2013.01); *H04H 2201/12* (2013.01); *H04L 25/0204* (2013.01); *H04W 84/12* (2013.01)

(58) Field of Classification Search
CPC ............. H04L 25/0208; H04L 25/0242; H04L 25/03006; H04L 25/067; H04W 84/12; H04W 84/14
USPC ....... 375/219, 220, 222, 229, 232, 233, 260, 375/262, 265, 267, 316, 340, 341, 343, 375/346–350; 348/725, 729; 370/310, 370/310.2, 328, 330; 455/500, 503, 526, 455/88, 553.1, 132, 137
See application file for complete search history.

(56) References Cited

U.S. PATENT DOCUMENTS

| | | | |
|---|---|---|---|
| 5,481,569 A | 1/1996 | Conti et al. | |
| 6,130,909 A * | 10/2000 | Anvari | H04L 1/06 375/232 |
| 6,246,698 B1 | 6/2001 | Kumar | |
| 6,351,500 B2 | 2/2002 | Kumar | |
| 8,126,095 B1 * | 2/2012 | Pare, Jr. | H04B 7/0413 375/267 |
| 9,014,316 B2 * | 4/2015 | Houtari | H04B 1/1081 375/347 |
| 9,570,105 B1 * | 2/2017 | Mathew | G11B 20/10046 |
| 2007/0071071 A1 * | 3/2007 | Li | H04L 25/03159 375/147 |
| 2008/0174470 A1 * | 7/2008 | Lum | H04B 7/0845 342/16 |
| 2009/0180413 A1 * | 7/2009 | Sutton | H04W 52/0225 370/311 |
| 2011/0130092 A1 * | 6/2011 | Yun | H04W 72/085 455/39 |
| 2013/0044840 A1 * | 2/2013 | Yamamoto | H04H 20/22 375/340 |
| 2013/0343494 A1 | 12/2013 | Bolinth et al. | |
| 2014/0184921 A1 * | 7/2014 | Sugiyama | H04B 7/0857 348/731 |

FOREIGN PATENT DOCUMENTS

EP 2 237 463 A1 * 6/2010
EP 3096479 A1 11/2016

* cited by examiner

SIGNAL PROCESSING USING MULTIPLE SOURCES

OVERVIEW

Aspects of the disclosure are directed to processing signals using data received on two or more receivers and/or communication mediums.

Various embodiments are directed toward addressing issues related to signal reception, which can present challenges to providing an accurate reception and, where applicable, playback of broadcast data. Certain embodiments address issues related to audio playback of radio station(s), such as in an automobile environment, which may suffer intermittent breaks or degradation in quality. For instance, while an automobile passes through a tunnel or under a high-power electrical line, the quality of reception of the transmissions can be reduced. When driving in the countryside or places far away from a broadcast station, coverage can be intermittent and/or weak. Various such applications may involve Digital Radio Mondiale (DRM), an international standard for radio broadcasts at frequencies below 30 MHz described in DRM System Specification, ETSI ES 201 980 V4.1.1 (2014-01).

These and other matters have presented challenges to efficiencies of signal communication implementations, for a variety of applications.

SUMMARY

Various example embodiments are directed to issues such as those addressed above and/or others which may become apparent from the following disclosure concerning the transmission and/or reception of signals. Respective signals received from different sources are combined to provide an output signal that may utilize corresponding data from each of the received signals to provide enhanced reception. For instance, where certain sets of broadcast data (e.g., bits or symbols) from one signal become distorted, corresponding data from another signal can be used in its place to provide a desirable output. In certain example embodiments, aspects of the present disclosure involve combining bits or other data sets based on a degree of confidence in the respective signals (or portions thereof) from which the bits or other data sets are gleaned.

As may be implemented in accordance with one or more embodiments, a method and/or apparatus involves processing respective signals carrying broadcast data provided by different receiver circuits that respectively receive the same broadcast data. The signals received from the respective receiver circuits are equalized, and corresponding sets of the broadcast data from each of the equalized signals are selectively combined to provide a combined signal carrying the broadcast data. This approach may be used, for example, to generate broadcast data utilizing source data from two or more receivers, such as may be received on different signal mediums (e.g., over-the-air digital radio and Wi-Fi digital radio), and therein providing enhanced reception.

As may be implemented with one or more embodiments, an apparatus includes first and second receiver circuits, and a signal processing circuit. The first receiver circuit is configured and arranged to receive signals carrying broadcast data via a first communication medium, and to down-convert the signals to a baseband frequency. The second receiver circuit configured and arranged to receive signals carrying the broadcast data via a second communication medium that is different than the first communication medium, and to down-convert the signals to a baseband frequency. The signal processing circuit is configured and arranged with the first receiver circuit and the second receiver circuit to equalize the down-converted signals from the first and second receiver circuits, and to combine the equalized signals from the first and second receiver circuits to provide a combined signal carrying the broadcast data.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving signal processing, such as may be utilized for receiving data over multiple channels, mediums and/or receivers, and which may be implemented to address challenges including those noted above. In certain implementations, aspects of the present disclosure have been shown to be beneficial when used in the context of receiving a common set of broadcast data at different receivers and/or via different sources, such as different communication mediums. In some embodiments, such approaches are utilized for receiving broadcast data by using two different sources or communication mediums/channels to provide a resulting broadcast signal that is more accurate than may be received, for example, using a single source. For instance, synergy of available receivers in a car environment can be utilized to provide a seamless (or nearly seamless) audio listening experience. Performance can be improved under hostile radio reception environments, and achieved with relatively low cost. While not necessarily so limited, various aspects may be appreciated through the following discussion of non-limiting examples which use exemplary contexts.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments involve apparatuses and/or methods implemented with radio reception, such as with a vehicle, in which a digital radio broadcast transmission is available from multiple receivers. For instance, an entertainment system may be equipped with a digital radio receiver. A user's mobile phone may have an internet protocol radio application that can receive the digital radio broadcast. In certain implementations in which a Wi-Fi option is available, by which the internet radio can be accessed. Two or more of these transmissions may be combined, providing the end user an improved audio listening experience.

Various embodiments involve utilizing two or more radio receivers for receiving digital radio broadcasts. Such receivers may include a tuner that tunes to a station, down-converts the signal to baseband frequency and delivers to a signal processing unit. The signal processing unit decodes the signal data, and multiplexes the transmission into a text data stream, audio stream, and image data. The decoded streams are provided to respective hardware for use by an end user. For example, audio data may be given to an audio control or speaker, text data and video data may be given to a display. Such a receiver may be augmented with one or more additional receivers, such as a mobile telephone receiving digital radio broadcast data over a mobile telephone network, or a Wi-Fi receiver that receives Wi-Fi signals carrying the digital radio broadcast data. Data in signals received at two or more of the receivers may be combined to provide output data that is enhanced.

Signal combination can be carried out using soft-bit combination, in a variety of manners. For instance, where a soft-bit representation of a data '1' is provided between the values of 0 and 127 with the value '0' meaning low confidence and the value '127' meaning high confidence, such representations can be added and used to provide a value that can then be used to determine whether the bit is a data '1.' Similarly, for a data '0,' soft bits may range between −128 and −1, the value can be averaged and used to determine whether the bit is indeed a data '0.'

As may be implemented with one or more embodiments, a method and/or an apparatus includes or uses data from multiple (two or more) receivers that receive signals carrying broadcast data via different communication mediums (e.g., via different communication protocols), and that down-convert the signals to a baseband frequency. The apparatus further includes a signal processing circuit (e.g., one or more logic circuits) that operates with the receivers to equalize the down-converted signals from the first and second receiver circuits, and combines the equalized signals to provide a combined/output signal carrying the broadcast data.

One of the receivers may be implemented as a digital radio receiver circuit that tunes to a frequency via which the signals are broadcast, and the other receiver is one of a mobile telephone that receives signals carrying the broadcast data via a mobile telephony signal that utilizes a mobile telephone communication protocol, and a Wi-Fi receiver configured to receive signals carrying the broadcast data via a Wi-Fi signal that utilizes a Wi-Fi protocol.

The signal processing circuit may be implemented in one or more of a variety of manners. In some embodiments, the signal processing circuit temporally aligns bits in the down-converted signals received at the first receiver to bits in the down-converted signals received at the second receiver. For each bit in the combined signal, the temporally-aligned bits from each of the down-converted signals are combined. In certain embodiments, the equalized signals are combined based on a weighing factor that is proportional to a confidence metric for each of the respective down-converted signals, in which the confidence metric for each signal is indicative of a degree of confidence that data in the down-converted signal is accurate. The equalized signals may also be combined by adding soft bit values of each bit in the equalized signals, averaging the added soft bit values, and providing the averaged soft bit values as respective bits of the combined signal. Certain embodiments involve adding amplitude values of the bit, and averaging the added amplitude values to provide an averaged bit. The combined signal including the averaged bits is then provided for use.

In some embodiments, a degree of confidence in the value of bits corresponding to a symbol or frame in received signals (e.g., down-converted signals) is assessed. Each bit received at one receiver is combined with a corresponding bit received at another receiver, based on the assessed degree of confidence and a threshold degree of confidence.

In a more particular embodiment, the signal processing circuit provides the respective down-converted signals as soft symbols in which data values of '1' and '0' are conveyed by varying amplitude, with the amplitude being proportional to the confidence of deciding on the data as being '1' or '0'. For each bit in the broadcast data, the amplitude from each signal is added and averaged and the combined symbol is provided with a bit corresponding to the averaged amplitude.

Various embodiments are directed to a method or related apparatus that operates upon broadcast data signals provided by different receiver circuits that respectively receive the same broadcast data, which may be implemented similarly to the above. For instance, first and second circuits may respectively operate to equalize and selectively combine corresponding sets of the broadcast data from each of the signals received from the respective receiver, to provide a combined signal carrying the broadcast data. A degree of confidence in the value of each bit corresponding to a symbol or frame in the signals received at the respective receivers can be estimated and, for each bit in corresponding symbols or frames, corresponding bits can be selectively combined based on the assessed degree of confidence and a threshold degree of confidence.

Figure 1:
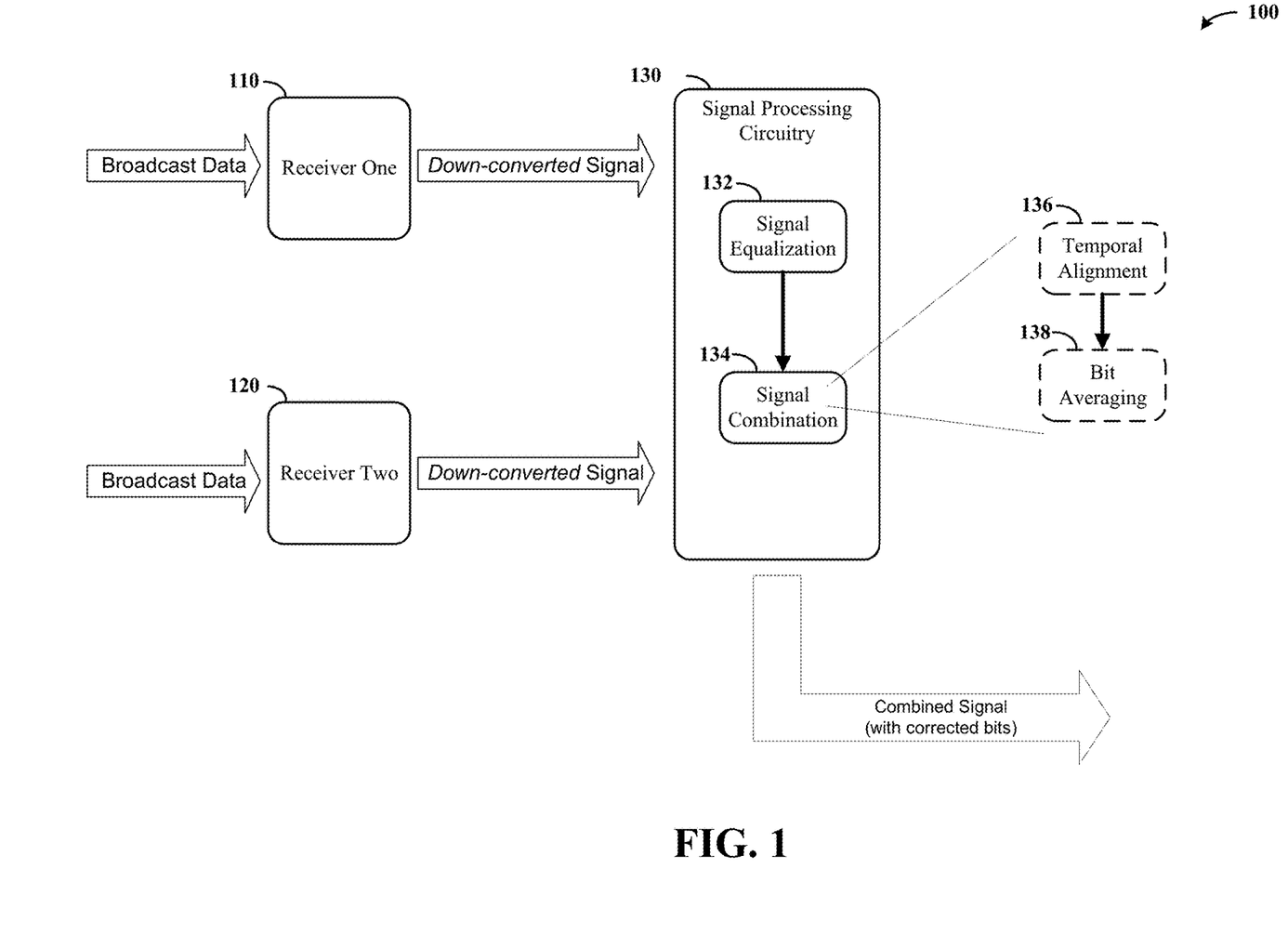
FIG. 1 illustrates an apparatus in accordance with the present disclosure.

Turning now to the figures, FIG. 1 shows an apparatus 100 as may be implemented in accordance with one or more embodiments. The apparatus 100 includes radio receivers 110 and 120, which respectively receive sets of broadcast data corresponding to a common set of broadcast data. For instance, media broadcast data such as that involving one or more of television, digital radio, podcasts, music services and others may be received in this regard. The received data is provided to signal processing circuitry 130, in one or more of a variety of manners. By way of example, the data is shown as having been down-converted at the receivers, for applicable signals and signal communication protocols. Other processing may also be carried out at one or both receivers, to suit particular applications, such as to suit a particular type of communication medium via which the broadcast data is received. For instance, where the communication medium is over-the-air digital radio broadcasts, the receivers may include digital radio receiver circuitry and functionality to facilitate reception. Where the communication medium is a Wi-Fi channel, the receiver may include circuitry for processing Wi-Fi signals.

The signal processing circuitry 130 includes a signal equalization block 132, and a signal combination block 134. The signal equalization block 132 equalizes signals from the respective receivers, and provides the equalized signals to the signal combination block 134, which combines the signals in a manner consistent with one or more embodiments herein. For instance, a confidence can be assessed for respective signals and/or corresponding data in those signals, and the data can be combined based on the assessed confidence. Such an approach may be implemented by assessing a confidence of whether a particular bit is accurate, and combining/using that bit with a corresponding bit received from a different signal based on the assessment. A combined signal is then output with corrected bits, which can be used.

The signal combination block 134 can be effected in one or more of a variety of manners. In some embodiments, a temporal alignment of the respective signals is carried out at block 136, in which bits or other data sets in the respective signals are aligned so that the bits or other data sets from each signal correspond to a common source bit or other data set. Bit averaging may be carried out at block 138 to effect combination, such as by averaging the signal value corresponding to respective bits. For instance, where signals are provided via amplitude level proportional to the confidence of deciding on the data as "1" or "0," the amplitudes of corresponding bits can be combined and averaged, with the averaged bit used to identify the bit as a "1" or a "0" value.

In certain embodiments, the signal processing circuit decodes data in the combined signal, multiplexes the decoded data into text data, audio data, and image data, and provides the text data stream, audio stream and image data as outputs. The signal processing circuit may include a signal detector circuit that detects the presence of a signal, a frame timing detector circuit that detects timing of data frames communicated in the signal, a frequency estimation and correction circuit that locks onto the frequency via which the signal is detected, and a channel estimator circuit that estimates channel gains for each of the communication mediums by providing channel propagation strength and propagation delay information for each communication medium. The equalizer circuit equalizes the received signal via the channel estimates, and provides the equalized signal to a de-mapper circuit, which in turn provides a de-mapped signal to a de-multiplexer circuit.

Figure 2:
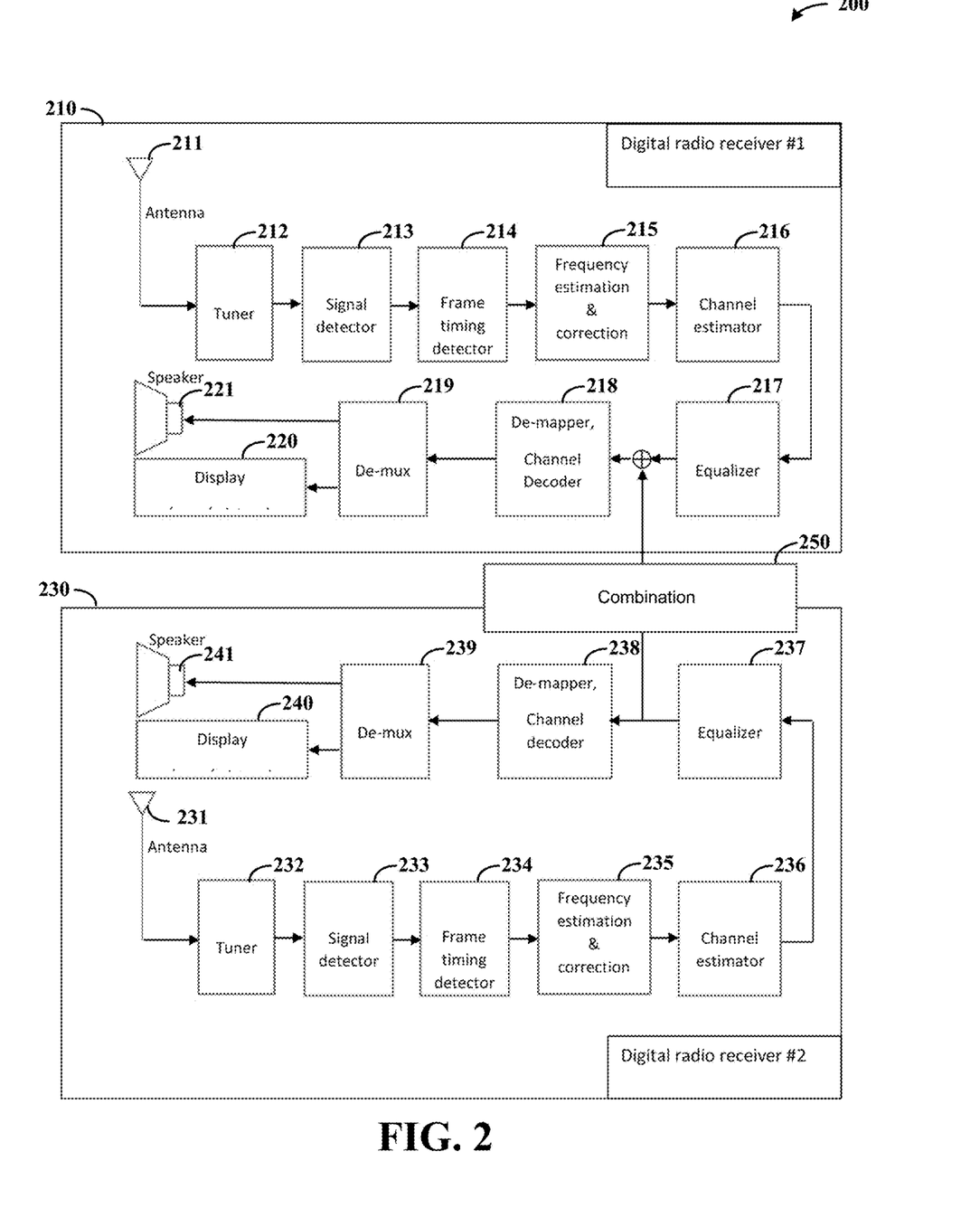
FIG. 2 shows an approach for soft-combining of digital radio receiver data at equalizer output, in accordance with the present disclosure.

As may be implemented with the above, FIG. 2 shows an approach 200 for soft-combining digital radio receiver data at equalizer outputs for respective digital radio receivers 210 and 230, as may be implemented in accordance with one or more embodiments. The blocks/modules shown may be implemented with one or more circuits, and may involve processing functions carried out/executed on common circuitry (e.g., including a processing circuit). Digital radio circuit 210 includes an antenna 211, tuner 212, signal detector 213, frame timing detector 214, frequency estimation & correction block 215, and channel estimator 216, which respectively process signals received at the antenna and provide the signal to equalizer 217. Digital radio circuit 230 includes an antenna 231, tuner 232, signal detector 233, frame timing detector 234, frequency estimation & correction block 235, and channel estimator 236, which respectively process signals received at the antenna and provide the signal to equalizer 237.

Referring to digital radio receiver 210 by way of example, the tuner 212 output data is processed by the signal detector 213 to detect the presence of a valid digital radio broadcast. If a valid signal isn't found, decoding of the digital radio broadcast signal is not resorted. On passing the criteria of detecting a valid radio signal, the timing and frequency is detected and corrected to prepare the signal for decoding the signal, with the frame timing detector locking onto transmission timing and the frequency estimation and correction unit locking onto the frequency. After locking onto the radio station in time and frequency, the channel estimator 216 estimates channel gains for each path, with the factors of channel propagation strength along with the respective propagation delay. The equalizer 217 makes use of the channel estimates to equalize the received signal, with the data at the output of the equalizer being generally devoid of channel propagation effects. Accordingly, the equalized data can be chosen as a place where the radio transmissions from various receivers are combined as shown, with block 250. However, combination can be effected at other points in the process, for instance before the equalizer.

The data at the output of the equalizer 217 may exist as soft symbols where the '1's and '0's are conveyed by varying amplitude, where the amplitude is proportional to the confidence of deciding on the data as '1' or '0'. As such, data can be added at this point in the receiver signal processing chain, by adding amplitudes. The added amplitude can then be averaged to provide a net amplitude, with a weighing factor proportional to the confidence of the data optionally provided, and then averaged to provide an average amplitude value that can be used to establish a data '1' or '0' for respective bits. However, combination can be effected at other points in the process, for instance before the equalizer.

A combination block 250 selectively combines equalized signals from the respective digital radio receivers, using one or more approaches as characterized herein. By way of example, further processing of the combined signals is shown carried out in digital radio receiver 210, with the signal provided to de-mapper/channel block 218 and demultiplexer 219, with resulting data being presented to a user. For this example, the data is being presented as text and/or video via display 220 and audio sound via speaker 221. However, other similar approaches may be carried out for different types of signals, including signals that are different than and/or don't include digital radio signals, with one or more types of outputs implemented as suitable for particular applications. Further, processing subsequent combination at 250 can be carried out on digital radio receiver 230, via de-mapper/channel block 238 and demultiplexer 239, display 240 and speaker 241.

In some embodiments in which one receiver is intermittently inferior to another receiver, bits from the receivers are soft-combined by preconditioning so that the combining is carried out when beneficial for achieving better audio and/or decoded data. The preconditioning may be implemented by carrying out soft-combining only when the metric is greater than a threshold value. For instance, the metric can be a simple averaging of absolute 'soft-bit' values to quantify the overall confidence of the soft-bit data. Such approaches can be carried out with combination block 250 in FIG. 2.

In some embodiments, where receiving paths of a car radio receiver and a car Wi-Fi receiver are from a same transmitter, channel estimates of the corresponding digital receivers can be used interchangeably to arrive at the decoded stream, where they are operating in an adjacent frequency range and the channel is not frequency selective. Accordingly, the channel estimation at 216 and 236 can be combined. Other circuitry can be similarly combined.

Figure 3:
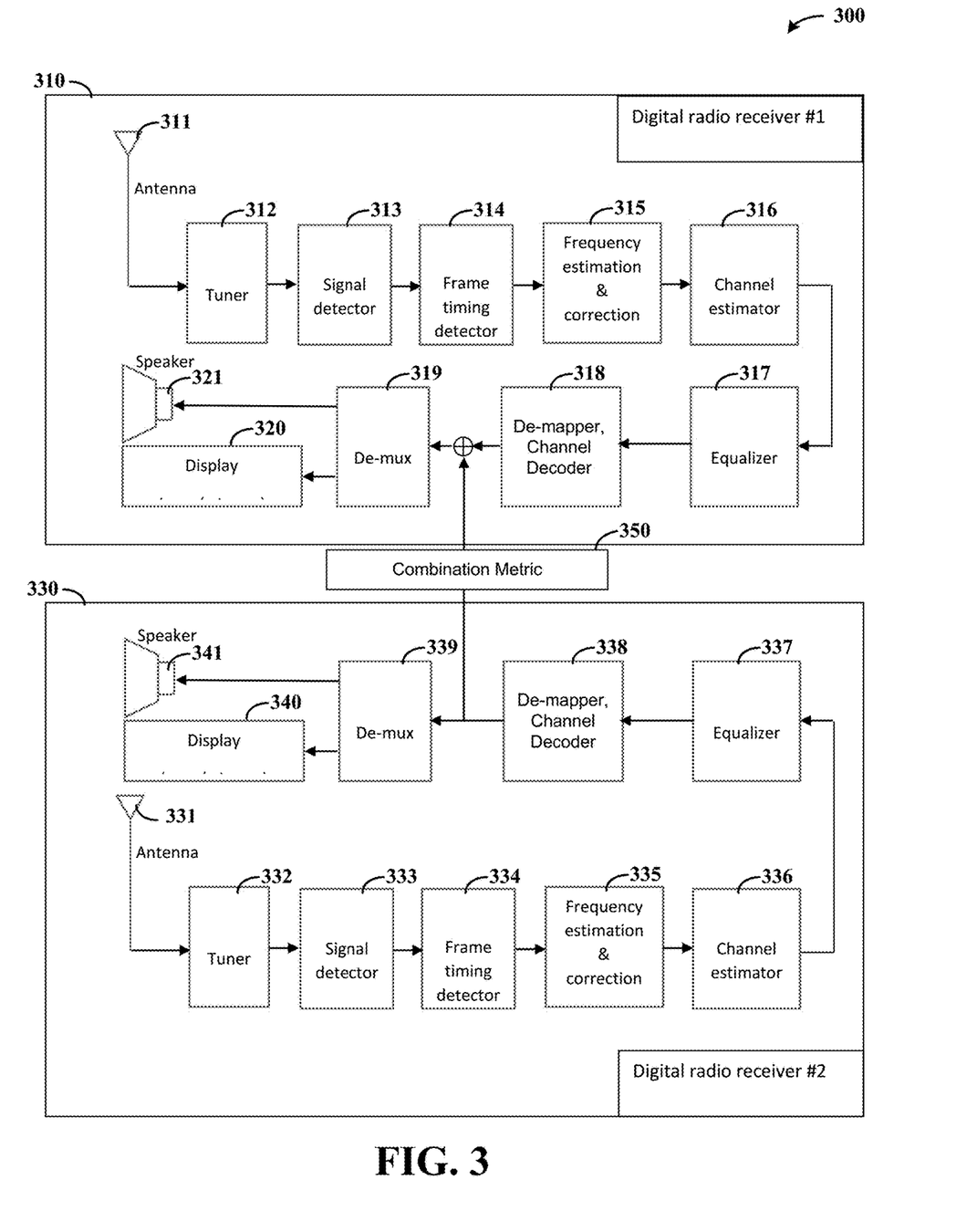
FIG. 3 shows an approach for soft-combining of digital radio receiver data at channel-decoder output, in accordance with the present disclosure.

Signal combination can be carried out at any point in the processing where the signal exists in soft-bit form. For instance, FIG. 3 shows another approach 300 for soft-combining digital radio receiver data at equalizer outputs for respective digital radio receivers 310 and 330, as may be implemented in accordance with one or more embodiments. The approach shown in FIG. 3 may be implemented in a manner similar to that shown in FIG. 2, with a combination block 350 carried out after a de-mapping/channel function. The blocks/modules shown may also be implemented with one or more circuits, and involve processing functions carried out/executed on common circuitry (e.g., including a processing circuit), with similar numbering carried out for similar components. Digital radio circuit 310 includes an antenna 311, tuner 312, signal detector 313, frame timing detector 314, frequency estimation & correction block 315, and channel estimator 316, which respectively process signals received at the antenna and provide the signal to equalizer 317. Digital radio circuit 330 includes an antenna 331, tuner 332, signal detector 333, frame timing detector 334, frequency estimation & correction block 335, and channel estimator 336, which respectively process signals received at the antenna and provide the signal to equalizer 337, and to de-mapper/channel block 318. Combination block 350 selectively combines signals from the respective digital radio receivers, using one or more approaches as characterized herein. Further processing of the combined signals is shown carried out on demultiplexer 319, with resulting data being presented as text and/or video via display 320 and audio sound via speaker 321. Processing subsequent combination at 350 can be carried out on digital radio receiver 330, via demultiplexer 339, display 340 and speaker 341.

In this embodiment, the transmissions of the digital radio broadcast signal are combined at the channel decoder output at 318, which can be provided in soft-bits instead of '1's and '0's. Adding the data at this point where the data exists in soft-bit form facilitates proportional addition relative to a confidence factor or factors of the respective bits. The soft-combined data is converted to hard-bits, and to audio stream by a source decoder or to a text/picture stream by corresponding source decoder (e.g., included with and/or after the combination block 350).

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, receiver, signal processing circuit and/or other circuit-type depictions (e.g., reference numerals 110, 120 and 130 of FIG. 1 depict a block/module as described herein). Such circuits or circuitry are used together with other elements to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi-) programmable circuits) configured and arranged for implementing these operations/activities, as may be carried out in the approaches shown in FIGS. 1, 2 and 3. In certain embodiments, such illustrated items represent one or more computer circuitry (e.g., microcomputer or other CPU) which is understood to include memory circuitry that stores code (program to be executed as a set/sets of instructions) for performing a basic algorithm (e.g., for signal combination) or the more complex process/algorithm as described above in connection with combining signals (e.g., soft bits) to perform the related steps, functions, operations, activities, etc. The specification may also make reference to an adjective that does not connote any attribute of the structure ("first [type of structure]" and "second [type of structure]") in which case the adjective is merely used for English-language antecedence to differentiate one such similarly-named structure from another similarly-named structure (e.g., "first circuit configured to convert . . . " is interpreted as "circuit configured to convert . . . "). On the other hand, specification may make reference to an adjective that is intended to connote an attribute of the structure (e.g., receiver circuit), in which case the adjective (e.g., receive) modifies to refer to at least a portion of the named structure (e.g., circuit) is configured to have/perform that attribute (e.g., receiver circuit refers to at least a portion of a circuit that includes/performs the attribute of receiving).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the methods characterized prior to the figures may be implemented with the apparatuses in FIG. 1, 2, or 3. Such modifications do not depart from the true spirit and scope of various aspects of the disclosure, including aspects set forth in the claims.

What is claimed is:

1. An apparatus comprising:
    a first receiver circuit configured and arranged to receive a first type of signals carrying broadcast data via a first wireless communication medium, and to down-convert the first type of signals to a baseband frequency;
    a second receiver circuit configured and arranged to receive a second type of signals carrying the broadcast data via a second wireless communication medium that is different than the first wireless communication medium in which the second type of signals are different than the first type of signals, and to down-convert the second type of signals to a baseband frequency; and
    signal processing circuitry configured and arranged with the first receiver circuit and the second receiver circuit to
        equalize the down-converted signals from the first and second receiver circuits, and
        combine the equalized signals from the first and second receiver circuits, based on an assessed degree of confidence that a portion of the down-converted signals from the first receiver circuit and from the second receiver circuit is accurate, to provide a combined signal carrying the broadcast data, wherein the signal processing circuitry is to combine the equalized signals by combining bits of corresponding symbols or of corresponding frames for signals received at the first receiver circuit and at the second receiver circuit, based on the assessed degree of confidence.

2. The apparatus of claim 1, wherein the signal processing circuitry is further configured and arranged to temporally align bits in the down-converted signals received at the first receiver circuit to bits in the down-converted signals received at the second receiver circuit, and to combine the equalized signals by combining, for each bit in the combined signal, one of the temporally-aligned bits from each of the down-converted signals.

3. The apparatus of claim 1, wherein
the first receiver circuit is configured and arranged to receive the first type of signals carrying the broadcast data using a first communication protocol set for the first wireless communication medium, and
the second receiver circuit is configured and arranged to receive the second type of signals carrying the broadcast data using a second communication protocol set for the second wireless communication medium that is different than the first communication protocol set.

4. The apparatus of claim 1, wherein the signal processing circuitry is configured and arranged to combine the equalized signals from the first and second receiver circuits to provide the combined signal by:
adding soft bit values of each bit in the equalized signals, averaging the added soft bit values, and
providing the averaged soft bit values as respective bits of the combined signal.

5. The apparatus of claim 1, wherein the signal processing circuitry is configured and arranged to combine the equalized signals from the first and second receiver circuits to provide the combined signal by:
for each bit in the equalized signals:
adding amplitude values of the bit, and
averaging the added amplitude values to provide an averaged bit; and
providing the combined signal including the averaged bits.

6. The apparatus of claim 1, wherein the signal processing circuitry is configured and arranged to:
provide the respective down-converted signals as soft symbols in which data values of '1' and '0' are conveyed by varying amplitude, the amplitude being proportional to a confidence of deciding on the data values as being '1' or '0'; and
for each bit in the broadcast data, adding and averaging the amplitude from each signal, and providing the combined signal with a bit corresponding to the averaged amplitude.

7. The apparatus of claim 1, wherein the first receiver circuit is a digital radio receiver circuit configured and arranged to tune to a frequency via which the signals are broadcast, and the second receiver circuit is one of: a mobile telephone configured and arranged to receive the signals carrying the broadcast data via a mobile telephony signal that utilizes a mobile telephone communication protocol, and a Wi-Fi receiver configured and arranged to receive the signals carrying the broadcast data via a Wi-Fi signal that utilizes a Wi-Fi protocol.

8. The apparatus of claim 1, wherein the signal processing circuitry is further configured and arranged to:
decode data in the combined signal;
de-multiplex the decoded data into text data, audio data, and image data; and
provide the text, audio and image data as outputs.

9. The apparatus of claim 1, wherein the signal processing circuitry includes circuits in the first receiver circuit and circuits in the second receiver circuit, and includes:

a signal detector circuit configured and arranged to detect presence of a signal;
a frame timing detector circuit configured and arranged to detect timing of data frames communicated in the signal;
a frequency estimation and correction circuit configured and arranged to lock onto the frequency via which the signal is detected;
a channel estimator circuit configured and arranged to estimate channel gains for each of the first and second wireless communication mediums, by providing channel propagation strength and propagation delay information for each wireless communication medium;
an equalizer circuit configured and arranged to equalize the signal via the channel estimates of the channel estimator circuit;
a de-mapper circuit configured and arranged to receive the equalized signal from the equalizer circuit and to provide a de-mapped signal; and
a de-multiplexer circuit configured and arranged to receive and de-multiplex the de-mapped signal from the de-mapper circuit.

10. An apparatus comprising:
a first receiver circuit configured and arranged to receive a first type of signals carrying broadcast data via a first wireless communication medium, and to down-convert the first type of signals to a baseband frequency;
a second receiver circuit configured and arranged to receive a second type of signals carrying the broadcast data via a second wireless communication medium that is different than the first wireless communication medium in which the second type of signals are different than the first type of signals, and to down-convert the second type of signals to a baseband frequency; and
signal processing circuitry configured and arranged with the first receiver circuit and the second receiver circuit to
equalize the down-converted signals from the first and second receiver circuits, and
combine the equalized signals from the first and second receiver circuits, based on an assessed degree of confidence that a portion of the down-converted signals from the first receiver circuit and from the second receiver circuit is accurate, to provide a combined signal carrying the broadcast data, wherein the signal processing circuitry is configured and arranged with the first receiver circuit and with the second receiver circuit to combine the equalized signals based on a weighing factor that is proportional to a confidence metric for each of the respective down-converted signals, the confidence metric for each of the respective down-converted signals being indicative of a degree of confidence that data in each of the respective down-converted signals is accurate.

11. An apparatus comprising:
a first receiver circuit configured and arranged to receive a first type of signals carrying broadcast data via a first wireless communication medium, and to down-convert the first type of signals to a baseband frequency;
a second receiver circuit configured and arranged to receive a second type of signals carrying the broadcast data via a second wireless communication medium that is different than the first wireless communication medium in which the second type of signals are different than the first type of signals, and to down-convert the second type of signals to a baseband frequency; and signal processing circuitry configured and arranged with the first receiver circuit and the second receiver circuit to
- equalize the down-converted signals from the first and second receiver circuits, and
- combine the equalized signals from the first and second receiver circuits, based on an assessed degree of confidence that a portion of the down-converted signals from the first receiver circuit and from the second receiver circuit is accurate, to provide a combined signal carrying the broadcast data, wherein the signal processing circuitry is configured and arranged to combine the equalized signals from the first and second receiver circuits based on the assessed degree of confidence to provide the combined signal by:

assessing a degree of confidence in a value of bits corresponding to a symbol or frame in the down-converted signals received at the second receiver circuit, and for each symbol or frame and the bits it corresponds to, combining each bit in a signal received at the first receiver circuit with a corresponding bit in a signal received at the second receiver circuit, based on the assessed degree of confidence and a threshold degree of confidence.

12. An apparatus for processing respective signals carrying broadcast data provided by different receiver circuits that respectively receive the same broadcast data, the apparatus comprising:

first circuitry configured and arranged to equalize the signals received from the different receiver circuits, the first circuitry including respective equalizer circuits, one of the equalizer circuits being configured and arranged to equalize signals received from one of the receiver circuits, and another one of the equalizer circuits being configured and arranged to equalize signals received from the other one of the receiver circuits; and second circuitry configured and arranged to:
- selectively combine corresponding sets of the broadcast data from each of the equalized signals to provide a combined signal carrying the broadcast data,
- assess a degree of confidence in a value of each bit corresponding to a symbol or frame in the signals received at the different receiver circuits, and
- for each bit in corresponding symbols or frames, selectively combine corresponding bits based on the assessed degree of confidence and a threshold degree of confidence.

13. A method for processing respective signals carrying broadcast data provided by different receiver circuits that respectively receive the same broadcast data, the respective signals being different than one another, the method comprising:

equalizing the signals received from the different receiver circuits, and selectively combining, based on an assessed degree of confidence that a portion of the equalized signals is accurate, corresponding sets of the broadcast data from each of the equalized signals to provide a combined signal carrying the broadcast data, wherein selectively combining includes selectively combining the corresponding sets of broadcast data provided by the different receiver circuits with corresponding bits of the equalized signals being combined based on an accuracy-indicative confidence metric for each of the signals carrying the corresponding bits.

14. The method of claim 13,
further including assessing the degree of confidence by assessing a degree of confidence in the value of each bit corresponding to a symbol or frame in the signals received at the different receiver circuits, and
wherein selectively combining the corresponding sets of the broadcast data includes, for each bit in the corresponding symbols or frames, selectively combining corresponding bits based on the assessed degree of confidence and a threshold degree of confidence.

15. The method of claim 13, further including receiving and down-converting the signals to a baseband frequency at the different receiver circuits, wherein equalizing the signals includes equalizing the down-converted signals in the baseband frequency.

16. The method of claim 13,
further including temporally aligning bits in the signals,
wherein selectively combining the corresponding sets of the broadcast data includes selectively combining temporally aligned ones of the bits.

17. The method of claim 13, wherein selectively combining the corresponding sets of the broadcast data further includes combining the corresponding bits based on a weighing factor that is proportional to the confidence metric for each of the signals carrying the corresponding bits, the confidence metric for each of the signals being indicative of a degree of confidence that data in each of the signals is accurate.

18. The method of claim 13, wherein selectively combining the corresponding sets of the broadcast data includes:
adding soft bit values of each bit in the equalized signals,
averaging the added soft bit values, and
providing the averaged soft bit values as respective bits of the combined signal.

19. The method of claim 13, wherein selectively combining the corresponding sets of the broadcast data includes:
for each bit in the equalized signals:
  adding amplitude values of the bit, and
  averaging the added amplitude values to provide an averaged bit; and
providing the combined signal including the averaged bits.

20. The method of claim 13, wherein selectively combining the corresponding sets of the broadcast data is based on the accuracy-indicative confidence metric indicating that at least a portion of down-converted signals from the different receiver circuits is accurate, and wherein one of the different receiver circuits is intermittently inferior in terms of data quality to of the different receiver circuits, and further including preconditioning bits from the different receiver circuits so that the step of selectively combining is carried out to optimize decoding of the down-converted signals.

* * * * *